United States Patent [19]

Fedele

[11] Patent Number: 4,567,357

[45] Date of Patent: Jan. 28, 1986

[54] METHOD OF AND APPARATUS FOR AUTOMATIC LINE IDENTIFICATION FOR RECORDING ON EMPLOYEE TIME CARDS AND THE LIKE

[75] Inventor: Vincent Fedele, Concord, Mass.

[73] Assignee: Kronos Incorporated, Boston, Mass.

[21] Appl. No.: 492,401

[22] Filed: May 6, 1983

[51] Int. Cl.[4] .............................................. G06K 7/10

[52] U.S. Cl. .................................... 235/377; 235/468; 235/476; 346/83

[58] Field of Search ........................ 235/377, 468, 476; 346/83

[56] References Cited

U.S. PATENT DOCUMENTS 3,536,894 10/1970 Travioli .......................... 235/468 X
4,270,043 5/1981 Baxter et al. ........................ 235/419
4,361,092 11/1982 Krakauer ............................ 101/426
4,401,994 8/1983 Witts et al. ........................... 346/83
4,471,217 9/1984 Engel ................................. 235/468

OTHER PUBLICATIONS

Simplex, TR-2C, 1982; Kronos Incorporated, Timekeeper Operator's Manual, 1980.

*Primary Examiner*—David L. Trafton
*Attorney, Agent, or Firm*—Rines and Rines Shapiro and Shapiro

[57] ABSTRACT

This disclosure is concerned with providing automatic identification of lines of time cards and the like on which time-in, time-out and related data is to be printed or recorded, by printing distinctive marks in the data field of the card on such lines, and sensing the presence of the marks to signal advancement on the next card usage to the next line.

2 Claims, 2 Drawing Figures

Figure 1:
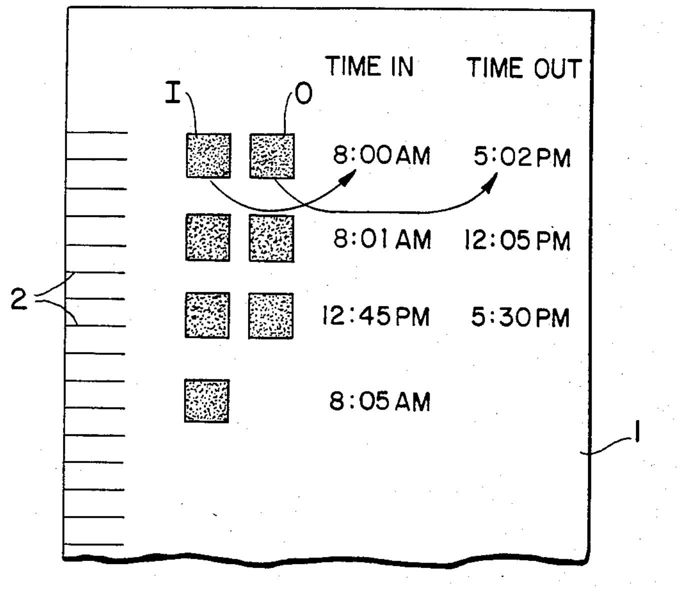

METHOD OF AND APPARATUS FOR AUTOMATIC LINE IDENTIFICATION FOR RECORDING ON EMPLOYEE TIME CARDS AND THE LIKE

The present invention relates to employee time card recording apparatus and methods, being more particularly concerned with the problem of automatically identifying, upon insertion of the card by the employee, the line on such time cards, containing previous recorded entries of work and exit times, at which subsequent "punch-in" or "punch-out" entries are to be recorded.

The alignment of time cards for such appropriate print line placement of the time card in the recorder has heretofore been accomplished by approximate manual orientation or by such devices as marginal apertures in the card perforated after each registration to identify last line of printing or other recording thereon. Prior systems of these types are described, for example, in U.S. Pat. Nos. 4,270,043 and 4,361,092 of Kronos, Incorporated, the common assignee of the present application, and in a bulletin entitled "TR-2C" of Simplex Time Recorder Co., of Gardner, Mass., 1982. Approximate registration, of course, can result in uneven and sometimes partially overlapping recorded data lines; while perforating apparatus and marginally disposed aperture or perforation sensors are required for such line identification.

A further serious restriction in current timeclock recorders is that a given employee/card is assigned to one and only one timeclock (or job-cost) terminal. It would be useful if one card/employee could be allowed to punch other clocks as well, presumably in other locations. The problem is, however, that a given card, once identified by employee/job (or other identification number), is assigned a "line-to-punch" number that is stored in computer memory. This way, the next time the card is entered, the clock will know where to print next by counting clock tracks on the edge of the card. After printing line n, n−1 is now the next line to print, and so on; but this is restricted to use with the assigned timeclock recorder and its memory and does not permit universal time card use with other recorder terminals.

An object of the present invention, on the other hand, is to provide a new and improved method of and apparatus for automatic line identification that obviates such and other disadvantages by enabling line registration through the recording, and preferably in the data field itself of the time card, of special printed or other marks applied during "punch-in" and "punch-out" recording on the line thereof, which are sensed on the card during insertion and cause automatic registraton or alignment with the next line to receive printing or other recording—and such being effective with any recorder terminal of the desired type.

A further object is to provide an improved recorder of more general utility, as well.

Other and further objects will be explained hereinafter and are more fully delineated in the appended claims.

In summary, however, from one of its aspects, the invention embraces a method of automatic line identification and alignment for recording data on time cards and the like that are to be presented at different times to a data recorder, that comprises, upon presentation of a card to the recorder at an initial time, simultaneously recording upon a first line of the card a first line-identifying mark and a first data entry; upon the further presentation of the card to the recorder at a subsequent time, sensing that there is only the first line-identifying mark recorded and thereupon presenting the card at the same first line for simultaneously recording upon the same first line a second line-identifying mark and a second data entry; upon still a further presentation of the card to the recorder at still a subsequent time, sensing the presence of both the first and second line-identifying marks on the first line and thereupon automatically presenting the card at a second line thereof for the recording of further data. Preferred details and best mode embodiment are later described.

Figure 2:
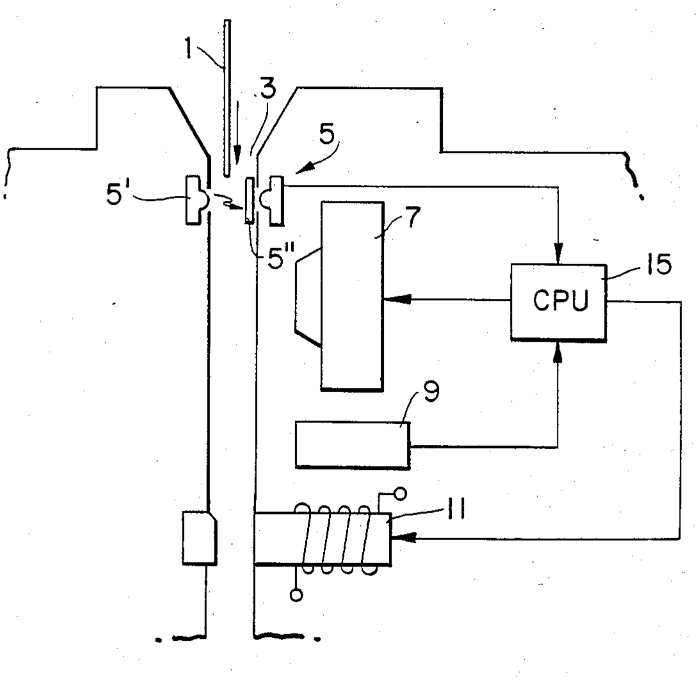

The invention will now be explained with reference to the accompanying drawing,

FIG. 1 of which is a front elevation of a preferred time card for use in connection with the invention and of the type described in said Letters Patent; and FIG. 2 is a combined block diagram and sectional view of time card recording apparatus, preferably of the type of said Letters Patent, embodying apparatus for carrying out the operation of the invention.

Referring to FIG. 1, such time card is shown at 1 carrying left-hand marginal clock lines or tracks 2 for counting in apparatus as described fully in said Letters Patent and in, for example, the manual entitled "Timekeeper Operators Manual" of said assignee, Kronos, Incorporated, 1980 . Vertical data columns labelled "Time In" and "Time Out" are identified with printed or recorded entries on successive horizontal lines alongside corresponding marginal clock lines or tracks, the first of which reads "8:00 AM" (for the employee "Time In" punch) and "5:02 PM" for the subsequent exit time that day. To the left, in the card data field, between the clock lines 2 and these recorded time entries, are shown two printed line-identifying blocks or distinctive marks I and 0 which, in accordance with the invention, are printed or recorded in the positions shown, and on the same line as the time entries, respectively when the "Time In" entry "8:00 AM" and the "Time Out" entry "5:02 PM" were recorded (as indicated by the explanatory associated arrow lines). Upon presentation or insertion of the time card 1 into the recorder, these blocks I and 0 are sensed on the data field and only if both are sensed as present, indicating a full line, does the apparatus automatically advance the card to present the next line to the printer for the next recording entries. The insertion of the card in FIG. 1 to the fourth recorded line ("8:05 AM" entry for "Time In"), containing only one block (I) would identify that the same line is the correct registration to receive the next "Time Out" print.

As more particularly shown in FIG. 2, wherein details of well-known apparatus components are omitted in order not to detract from the essential features of novelty of the invention (reference being made to said Letters Patent and said manual for such details, for example), the card is shown inserted in the recorder receiving guide 3 (as in said U.S. Pat. No. 4,270,043), provided with a line-identification mark sensor 5 disposed near the top of the guide throat, and oriented so that the left-hand data field portion (where the I and 0 marks of FIG. 1 are to be applied) passes the sensor 5. The marks may be applied by a print head 7 (later more fully explained) that records in a special ink (such as infra-red absorbing). For such an embodiment, an infrared emitter 5′, as of the LED type, may pass its beam to the sensor 5, with infra-red absorbing ink (ribbon and rollers) employed by the printer 7 in recording the line-identifying marks I and 0 at the appropriate times. Alternatively, the marks may simply be reflectively sensed.

It should be noted that in this embodiment, the line-identifying blocks are applied by the same printer 7 that is used to print the IN and OUT times, making a separate mechanism for applying these blocks unnecessary. Alternately, a separate mechanism dedicated to applying these line-identifying blocks could be used.

As explained in said Letters Patent and manual, the data on the card 1 passes a reader 9 and is held for printing by a clamping mechanism 11, with the clock tracks 2 sensed by the clock-track sensing unit of the reader 9 associated with a central processing unit 15 (CPU) input data port. Such operation assumes a known area of the card seen by the remote sensor 5 to be white or not printed; and a resulting value of several samples of white, appropriately weighted (such as the highest of five samples of white multiplied by 1.3) can serve as a threshhold value. Anything read at 5 that exceeds this threshhold value is assumed to be a dark (or black) mark—in this case, made by the printer 7. The CPU 15 next counts the card edge clock tracks or lines 2, and causes the printer 7 to print a new mark I (or 0) on the appropriate line, and then the data text, such as the time of check in (or check-out). The counting of clock tracks is required due to the placement of the sensor 5 and print head 7 and related geometry.

When the sensor 5 (through a pair of side-by-side infra red emitter-sensor units) detects, upon presentation of the card 1 into the recorder guide 3, the presence of both I and 0 marks on a line by infra-red beam transmission therethrough, indicating all data filled on the corresponding line, it causes the clamping of the card at 11 at the next successive line for subsequent recording. Thus the individual recorder with which the card is used does not have to have information as to the number of clock tracks or lines involved, but identifies the appropriate line for printing by the sensing of distinctive marks I and 0 on the last line, thereby enabling universal use of a card with any timeclock recorder equipped with these hardware/software features.

If the emitter 5' is not an infra-red source, but, say, a tungsten source (2870° Kel, for example), any black ink could be used with the addition of a spectral shift filter shown at 5'', such as of infra-red absorbing glass. While two infra red emitter/sensors may be used for each of the adjacent marks I and 0, any number of marks and sensor emitters may be employed, if desired; and further modifications will occur to those skilled in this art, with such being considered to fall within the spirit and scope of the invention as defined in the appended claims.

What is claimed is:

1. In a time card recording apparatus having card receiving, clamping and printing means, the improvement of means carried by the printing means to print distinctive line-identifying marks as well as time-in and time-out data entries on successive lines, one mark for time-in and a second for time-out; and means disposed as the card is presented to the receiving means, for sensing the presence of both marks and, in the event one mark only is present, actuating the clamping means on the same line as said one mark so that the next print by the printing means is on the same line; and, if both marks are present, actuating the clamping means to clamp the card at the next line.

2. Apparatus as claimed in claim 1 and in which said printing means applies said marks in an ink susceptible to the sensing means detecting infra-red components thereof transmitted by light beam means upon said card.

* * * * *